No. 607,154. Patented July 12, 1898.
G. BERCK.
SCOOP HANDLE ATTACHMENT.
(Application filed Apr. 24, 1897.)

(No Model.)

Witnesses
Arthur Ashley
Victor J. Evans

Inventor
George Berck
By John Wedderburn,
Attorney

UNITED STATES PATENT OFFICE.

GEORGE BERCK, OF BOELUS, NEBRASKA.

SCOOP-HANDLE ATTACHMENT.

SPECIFICATION forming part of Letters Patent No. 607,154, dated July 12, 1898.

Application filed April 24, 1897. Serial No. 633,654. (No model.)

*To all whom it may concern:*

Be it known that I, GEORGE BERCK, a citizen of the United States, residing at Boelus, in the county of Howard and State of Nebraska, have invented certain new and useful Improvements in Scoop-Handle Attachments; and I do hereby declare the following to be a full, clear, and exact description of the invention, such as will enable others skilled in the art to which it appertains to make and use the same.

In shoveling grain into bags it is necessary to employ two hands in order that the scoop which is used will not slip from side to side.

My invention consists of an attachment for the handles of grain-scoops whereby said scoop may be operated with one hand. Said attachment consists of a bar having a bifurcated rear end in which the elbow of the operator is adapted to fit, and a semicircular forward end constituting a part of a clamp, and a curved bar pivoted to the forward end of said attachment constituting the other part of the clamp and held in place by means of a bolt and a thumb-nut thereon.

The invention also consists in other details of construction and combination of parts, which will be hereinafter more fully described and claimed.

Figure 1:
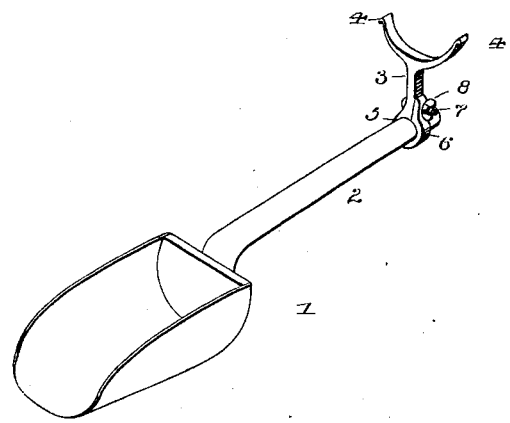
Figure 2:
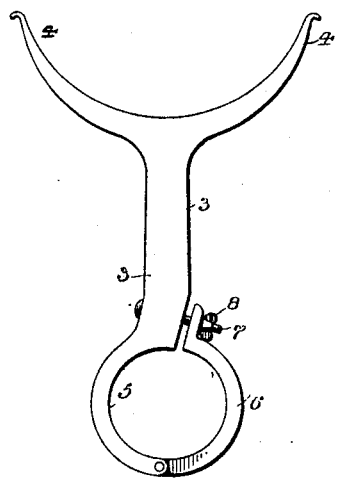

In the drawings forming part of this specification, Figure 1 represents a perspective view of my device shown in operative position with the scoop clamped thereto. Fig. 2 is a plan view of the same with the scoop detached and the clamp open.

Like reference-numerals indicate like parts in both views.

The scoop 1 and the handle 2 thereof are both of the usual form and construction.

My attachment is made up of a bar 3, having a yoked or bifurcated rear end forming two outwardly-curved arms 4 4, between which the elbow of the operator is adapted to fit. The straight portion of said bar acts as the handle and has upon its forward end a curved extension 5, clearly shown. Said curved extension and the curved bar 6, pivoted thereto, constitute a clamp which embraces the handle 2 of the scoop, the free end of the bar 6 being held in adjusted position by means of a threaded bolt 7, passing through the bar 3, and a thumb-screw 8 thereon.

In using my device the clamp on the forward end of the attachment is opened and the handle 2 of the scoop inserted between the members thereof. The same are afterward closed and drawn up into close contact with the handle 2 by means of the thumb-screw 8. When thus in place, the device is grasped by a straight portion of the bar 3, with the elbow of the operator resting between the bifurcated ends thereof. The scoop is held from slipping to one side or the other by the elbow, and said scoop may therefore be operated by one hand.

Having now described my invention, what I claim as new, and desire to secure by Letters Patent, is—

A handle attachment for scoops and like devices consisting of a saddle or U-shaped part in which the forearm rests; a standard depending therefrom and provided at its lower end with a curved extension, a piece pivoted to said extension and a bolt passing through the free end of the pivoted link and standard whereby the device may be secured to the handle.

In testimony whereof I have signed this specification in the presence of two subscribing witnesses.

GEORGE BERCK.

Witnesses:
 PETER MOOY,
 ALBERT JAENICKE.